US012180755B2

(12) United States Patent
Frattini et al.

(10) Patent No.: US 12,180,755 B2
(45) Date of Patent: Dec. 31, 2024

(54) VEHICLE DOOR HANDLE ASSEMBLY

(71) Applicant: U-shin Italia S.p.A, Pianezza (IT)

(72) Inventors: Massimo Frattini, Pianezza (IT); Anthony Guerin, Turin (IT); Antonio Rocci, Settimo (IT); Thomas Devernois, Fourchambault (FR)

(73) Assignee: U-shin Italia S.p.A, Pianezza (IT)

( * ) Notice: Subject to any disclaimer, the term of this patent is extended or adjusted under 35 U.S.C. 154(b) by 204 days.

(21) Appl. No.: 17/870,085

(22) Filed: Jul. 21, 2022

(65) Prior Publication Data

US 2023/0026547 A1 Jan. 26, 2023

(30) Foreign Application Priority Data

Jul. 22, 2021 (EP) .................................... 21187296

(51) Int. Cl.
*E05B 81/76* (2014.01)
*E05B 85/10* (2014.01)

(52) U.S. Cl.
CPC .............. *E05B 81/76* (2013.01); *E05B 85/10* (2013.01)

(58) Field of Classification Search
CPC .......... E05B 81/00; E05B 81/56; E05B 81/64; E05B 81/76–78; E05B 85/00; E05B 85/10; E05B 85/103; E05B 85/107; E05B 85/12–14; E05B 85/16; E05B 85/18
USPC ........................................................... 70/237
See application file for complete search history.

(56) References Cited

U.S. PATENT DOCUMENTS

2005/0121920 A1* 6/2005 Machida ................. E05B 83/40 292/201
2006/0038417 A1* 2/2006 Pudney ................... E05B 77/06 292/336.3
2017/0159333 A1* 6/2017 Beck ........................ E05B 79/06
2021/0071451 A1* 3/2021 Vrsecký .................. E05B 81/77

FOREIGN PATENT DOCUMENTS

DE 10 2006 029 774 A1 1/2008
DE 10 2016 101 568 A1 8/2017
DE 10 2020 209 488 A1 3/2021

OTHER PUBLICATIONS

Extended European Search Report issued Jan. 26, 2022 in European Application 21187296.5 filed on Jul. 22, 2021, 6 pages (with Written Opinion).

* cited by examiner

*Primary Examiner* — Nathan Cumar
(74) *Attorney, Agent, or Firm* — Oblon, McClelland, Maier & Neustadt, L.L.P.

(57) ABSTRACT

A vehicle door handle assembly includes a handle trigger including: an articulated end so that the handle trigger can be movable around the articulated end between a rest position and an open position when a user pulls on the handle trigger, an activation end at the opposite side of the articulated end, to release a latch of the vehicle door, a handle structure intended to be fixed to the panel of the vehicle door, wherein the vehicle door handle assembly further includes a flexible bellow gasket housed into the handle structure and arranged between the activation end of the handle trigger and the handle structure.

7 Claims, 4 Drawing Sheets

VEHICLE DOOR HANDLE ASSEMBLY

TECHNICAL FIELD

The present invention relates to the field of vehicle door handles to control the opening of vehicle doors.

BACKGROUND OF THE INVENTION

In the vehicle door handles of the state of the art, handles are known that comprise a handle trigger connected to a fixed portion, also called a handle structure, both of which are designed to be installed on the door panel and accessed from the outside of the vehicle. The user pulls the handle trigger so that it rotates outwardly against the bottom of the handle structure to open the door. During the rotation, the handle trigger usually activates a microswitch to electrically release the latch. After this electrical release, the handle trigger pulls a Bowden cable to mechanically release the latch. When the handle trigger is released by the user, the handle trigger is springily biased toward the rest position.

These vehicle door handles also usually comprise seals between the handle structure and the door panel to prevent water or dust from getting inside the door panel through the panel's cavities. However, such seals are very efficient in static position but, when subject to motion, some water may enter into the handle while the handle trigger is moved, in particular by passing through the pivoted handle trigger in its open position and then, through the handle structure, to get into the door panel.

SUMMARY OF THE INVENTION

The purpose of the invention is therefore to provide a vehicle door handle assembly which tightness is improved.

Thus, the present invention refers to a vehicle door handle assembly comprising:

- a handle trigger comprising:
  - an articulated end so that the handle trigger can be movable around the articulated end between a rest position and an open position when a user pulls on the handle trigger,
  - an activation end at the opposite side of the articulated end, to release a latch of the vehicle door,
- a handle structure intended to be fixed to the panel of the vehicle door, wherein the vehicle door handle assembly further comprises:

- a flexible bellow gasket housed into the handle structure and arranged between the activation end of the handle trigger and the handle structure.

In the rest position, the flexible bellow gasket prevents water or dust from getting inside the panel of the vehicle door through the through-housing. In the open position, the flexible bellow gasket is expanded compared to the rest position, as the user pulls on the handle trigger. In this open position, the flexible bellow gasket also prevents water or dust from getting inside the panel of the vehicle door through the through-housing. Thus, in both positions, the flexible bellow gasket prevents water or dust from getting inside the panel of the vehicle door through the through-housing. The sealing may therefore be kept by means of the flexibility of the bellow gasket regardless of the position of the handle trigger, in the rest position as well as in the open position and during the movement of the handle trigger between the rest position and the open position.

The vehicle door handle assembly can also comprise one or more of the features which are described hereinbelow, taken alone or in combination.

The flexible bellow gasket may be squeezed in the rest position and expanded in the closed position.

The handle structure may comprise a through-housing intended to pass through a hole of the panel of the vehicle door, allowing a flexible cable to be fastened to a fastening mean of the activation end.

The flexible bellow gasket may have a first end fixed to the activation end around a rod wearing the fastening mean and a second end arranged at an opening of the through-housing inside the handle structure.

The flexible bellow gasket may have a cylindrical shape.

Each end of the flexible bellow gasket may have a respective retaining collar.

The flexible bellow gasket may have a pyramidal shape, the smallest end being on the handle structure side.

The flexible bellow gasket may be made of silicone, caoutchouc or of an elastomer.

The vehicle door handle assembly may comprise an elastic member interposed between the handle trigger and the handle structure to force the handle trigger back to the rest position.

The vehicle door handle assembly may comprise an electrical commutator, which is activated in the open position by the activation end of the handle trigger.

The invention will be better understood in view of the following description, referring to the annexed figures in which.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments.

In the rest of the description, the outside is the side corresponding to the outside environment of a motor vehicle as opposed to that designating the inside of the passenger compartment when the vehicle door is closed.

Figure 1A:
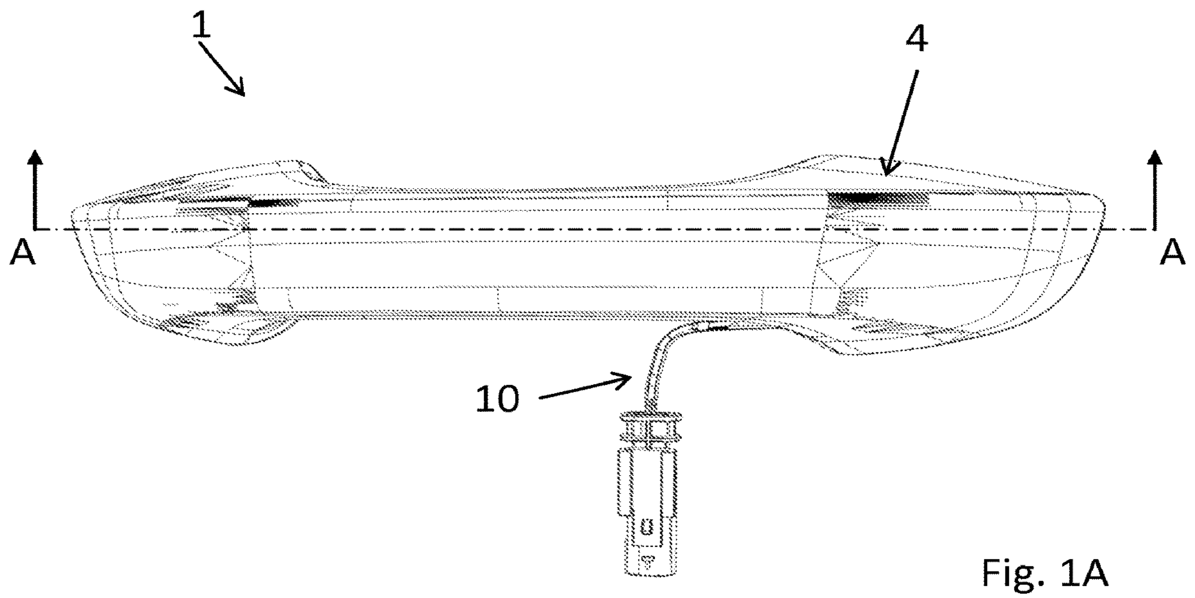
FIG. 1A is a perspective view of a vehicle door handle assembly.
Figure 1B:
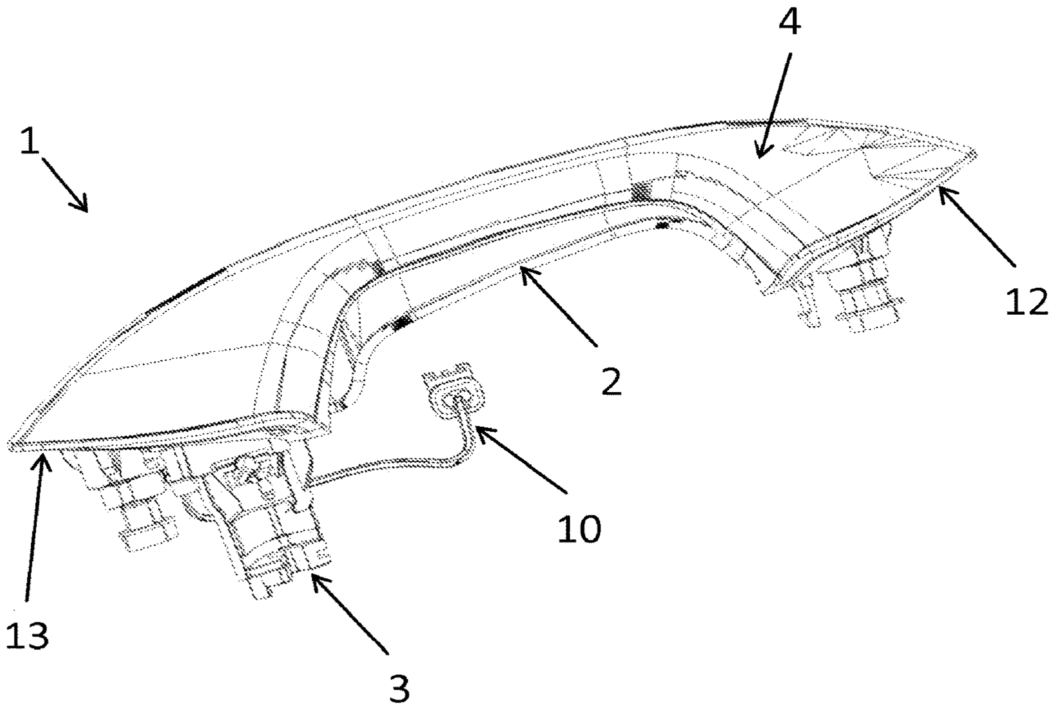
FIG. 1B is a pivoted view of the vehicle door handle of FIG. 1A.
Figure 2:
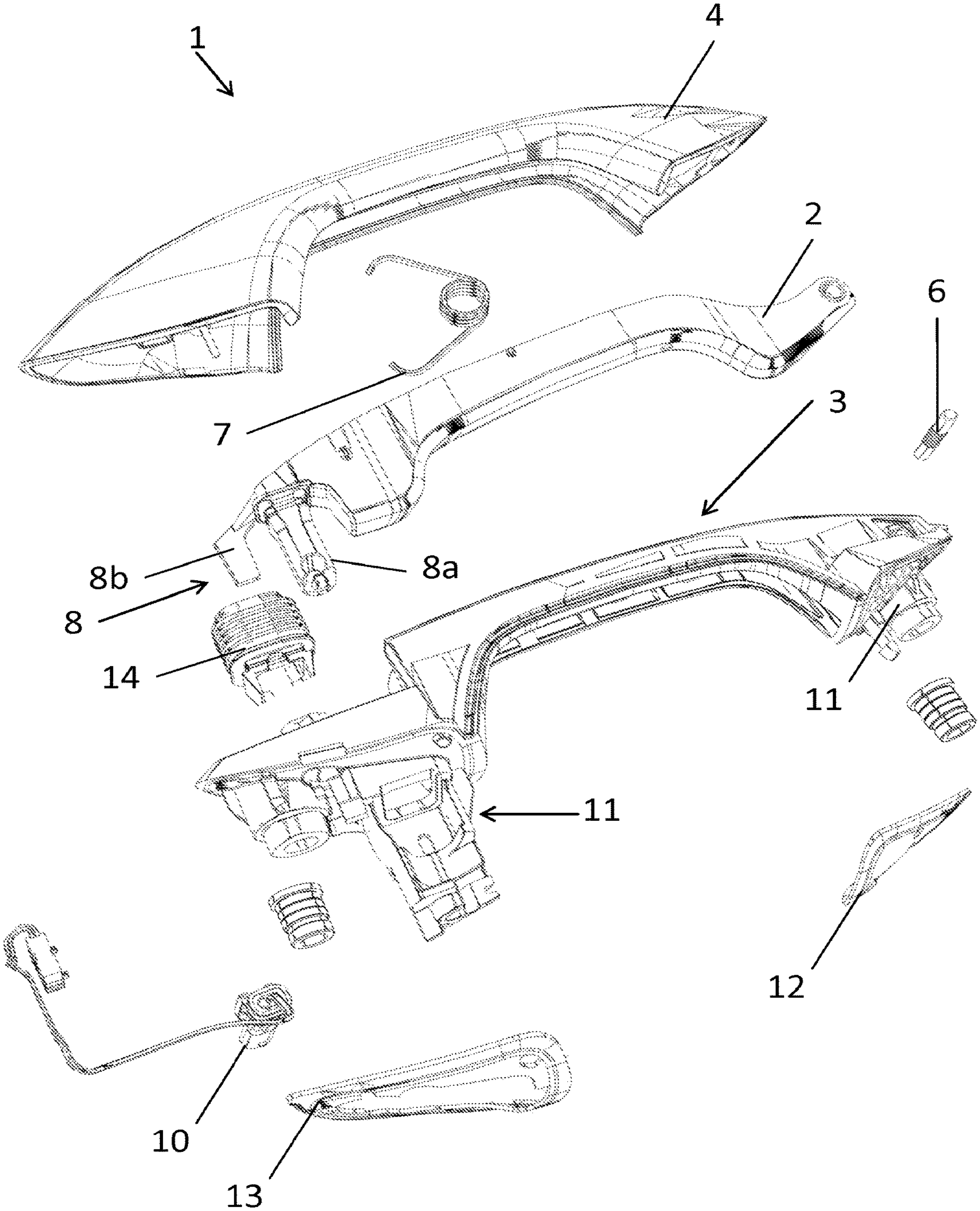
FIG. 2 is an exploded view of the vehicle door handle assembly of FIG. 1A.

FIGS. 1A, 1B and 2 show a vehicle door handle 1 assembly which is intended to be fixed to the panel of a door, in order to open it.

The vehicle door handle 1 assembly has a generally "C-shaped" accessible from the outside of the vehicle, to be grasped by a user. It comprises a handle trigger 2, a handle structure 3 and a handle cover 4.

The handle trigger 2 is connected to the handle structure 3.

The handle trigger 2 comprises a articulated end 5 so that the handle trigger 2 can be movable around the articulated end 5 between a rest position (FIG. 3B) and an open position (FIG. 3A) for the opening of the vehicle door when a user pulls on the handle trigger 2. According to an embodiment, the vehicle door handle 1 assembly comprises a rotation spindle 6 (see FIG. 2) mounted in a cylindrical cavity of the handle trigger 2 in the articulated end 5, for the rotation of the handle trigger 2 in operation, about the rotation spindle 6 relative to the handle structure 3.

The handle trigger 2 and the handle structure 3 are housed into the handle cover 4. According an embodiment, the handle trigger 2 is housed in the handle structure 3 except for an actionable part of the handle trigger 2, actionable by the user, which goes beyond the handle structure 3 and the handle cover 4 in the rest position (FIG. 1B). This actionable part of the handle trigger 2 is housed in the handle structure 3 in the open position (FIG. 3A).

Figure 3A:
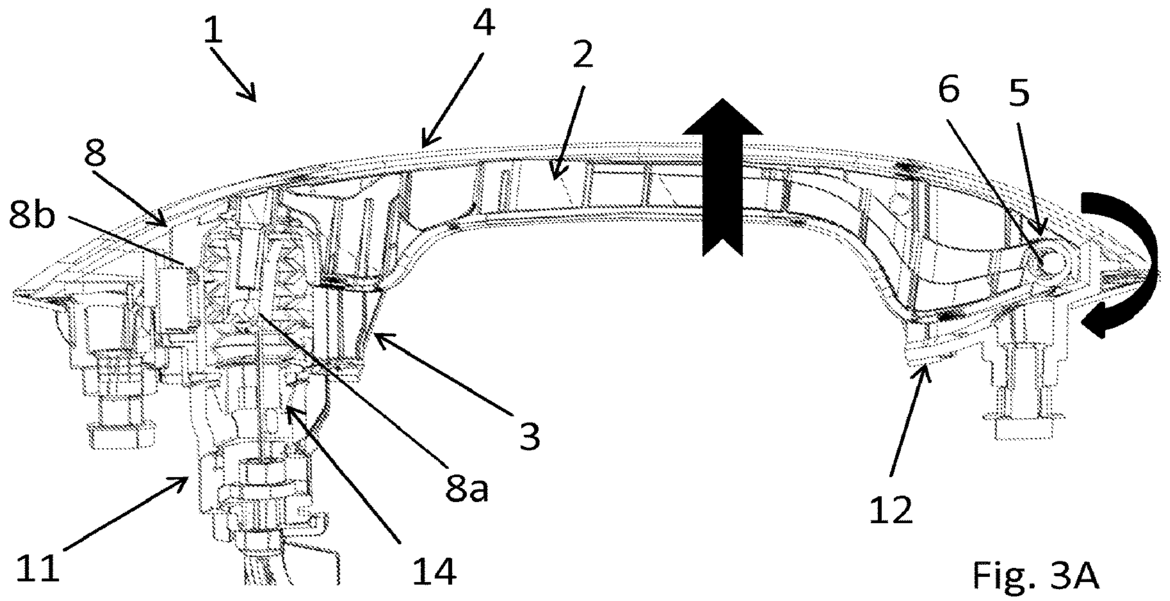
FIG. 3A is cross-sectional view of the vehicle door handle assembly (according A-A) of FIG. 1A, in open position.
Figure 3B:
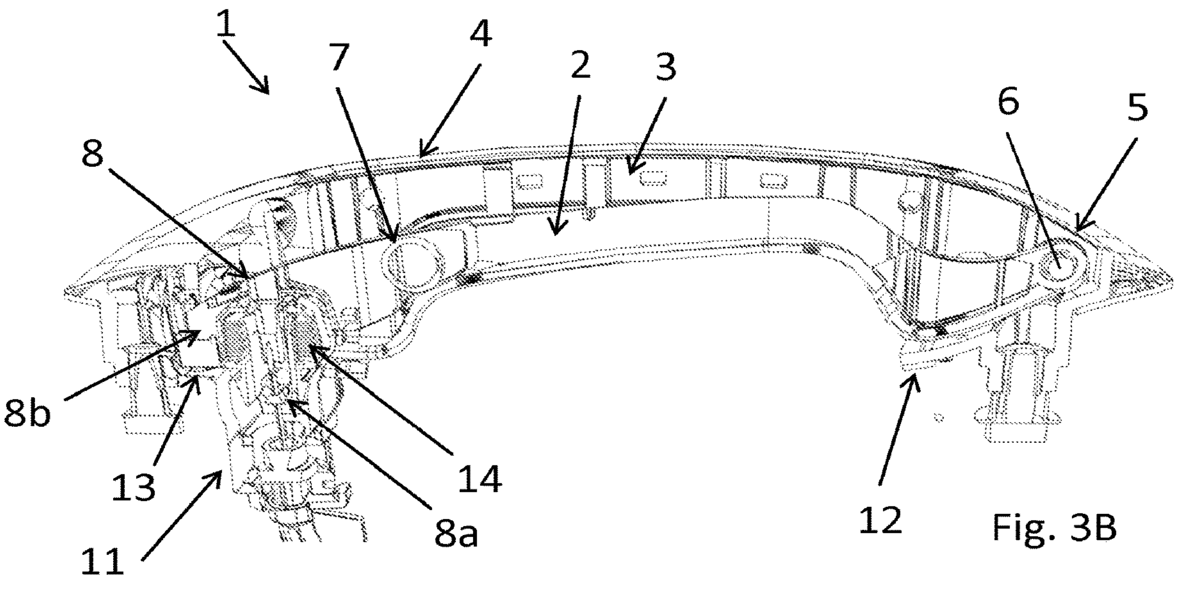
FIG. 3B is a similar view of the cross-sectional view of the vehicle door handle assembly of FIG. 3A in a rest position.

The vehicle door handle 1 may also comprise an elastic member 7 interposed between the handle trigger 2 and the handle structure 3 to force the handle trigger 2 back to the rest position (see FIGS. 3A and 3B).

The handle trigger 2 comprises an activation end 8 at the opposite side of the articulated end 5.

The activation end 8 may be intended to pull on a flexible cable, such as a Bowden cable, (not shown) in the open position, to mechanically activate the latch, for example by actuating an element of a lock of the vehicle.

The vehicle door handle 1 assembly may comprises an electrical commutator 10, such as a microswitch assembly, designed to be connected to the electrical circuits of the vehicle, for the electrical activation of the latch of the vehicle door. The electrical commutator 10 is activated in the open position by the activation end 8 of the handle trigger 2 during the rotation of the handle trigger 2. To this end, the activation end 8 of the handle trigger 2 may comprise a protrusion 8*b*, intended to press the microswitch assembly 10 in the open position.

The vehicle door handle 1 assembly may be configured to only electrically release the latch by means of the electrical commutator 10 or to only mechanically release the latch by pulling on the Bowden cable or may be configured to release the latch both electrically and mechanically or the vehicle door handle 1 assembly may be configured to only electrically release the latch by means of the electrical commutator 10, the mechanically activation of the latch being a back-up necessity.

The handle structure 3 is intended to be fixed to the panel of the vehicle door, at both ends of the handle structure 3, for example by screwing, to an inner bracket (not shown) designed to be installed inside the panel of the vehicle door.

The handle structure 3 may comprise a through-housing 11 intended to pass through a hole of the panel of the vehicle door, allowing the crossing of the flexible cable of the vehicle to be fastened to a fastening mean 8*a*, such as a hook, of the activation end 8.

The vehicle door handle 1 may comprise a front gasket 12 placed between the panel of the vehicle door and the handle structure 3 on the side of the articulated end 5 of the handle trigger 2 and a rear gasket 13 placed between the panel of the vehicle door and the handle structure 3 on the side of the activation end 5 of the handle trigger 2, around the through-housing 11.

The vehicle door handle 1 assembly further comprises a flexible bellow gasket 14 housed into the handle structure 3, arranged between the activation end 8 of the handle trigger 2 and the handle structure 3.

Figure 4A:
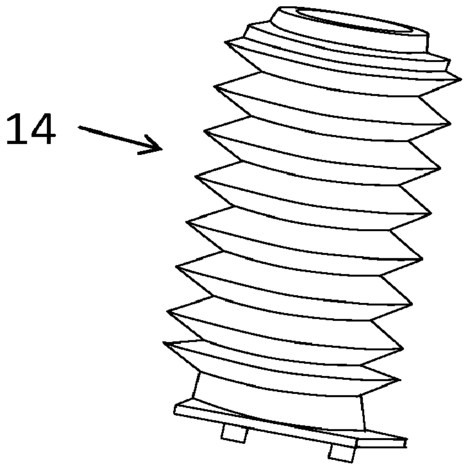
FIG. 4A is a perspective view of a flexible bellow seal of the vehicle door handle of FIG. 3A in open position.
Figure 4B:
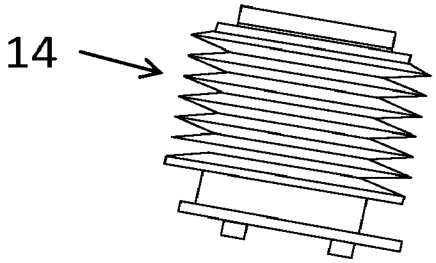
FIG. 4B is a similar view of the flexible bellow seal of FIG. 4A, in the rest position.

The flexible bellow gasket 14 is an expandable gasket that has at least one fold, such as between three and seven folds, such as five folds (see FIGS. 4A, 4B).

The flexible bellow gasket 14, 14', 14" can be made of silicone, caoutchouc or of elastomer, such as EPDM.

The flexible bellow gasket 14 may have a cylindrical shape. Each end of the flexible bellow gasket 14 may have a respective retaining collar (see FIGS. 4A, 4B).

The flexible bellow gasket 14 may has a first end fixed to the activation end 8 around a rod wearing the fastening mean 8*a* and a second end arranged at an opening of the through-housing 11 inside the handle structure 3. The bellow geometry is particularly suitable for the very narrow space available in the vehicle door handle 1 assembly.

In the rest position, the flexible bellow gasket 14 may be squeezed (FIGS. 3B and 4B) as the elastic member 7 forces the handle trigger 2 back to the rest position. The flexible bellow gasket 14 prevents water or dust from getting inside the panel of the vehicle door through the through-housing 11.

When a user wants to open the door, he pulls on the handle trigger 2 so that it rotates outwardly in the handle structure 3. During the rotation, the handle trigger 3 activates the electrical commutator 10 to electrically release the latch. After this electrical release, the handle trigger 3 pulls the flexible cable to mechanically release the latch.

In the open position (FIGS. 3A and 4A), the flexible bellow gasket 14 is expanded compared to the rest position of the handle 1 and may be expanded compared to its own rest position, as the user pull on the handle trigger 2, raising the activation end 8 to pull on the flexible cable. In this open position, the flexible bellow gasket 14 also prevents water or dust from getting inside the panel of the vehicle door through the through-housing 11.

When the handle trigger 2 is released by the user, the handle trigger 2 is springily biased toward the rest position.

Thus, in both positions, the flexible bellow gasket 14 prevents water or dust from getting inside the panel of the vehicle door through the through-housing 11. Thus, the sealing may be kept by means of the flexibility of the bellow gasket 14 regardless of the position of the handle trigger 2, in the rest position (FIG. 3B) as well as in the open position (FIG. 3A) and during the movement of the handle trigger 3 between the rest position and the open position.

Figure 5A:
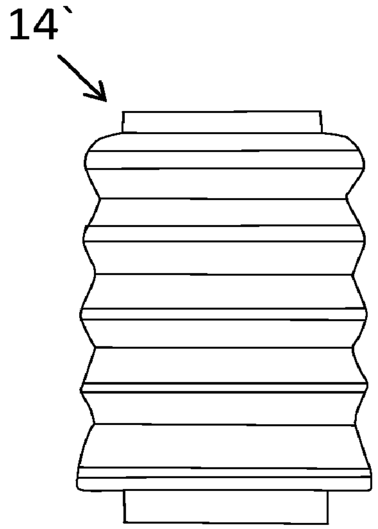
FIG. 5A is a perspective view of a first variant of the flexible bellow seal, shown in open position.
Figure 5B:
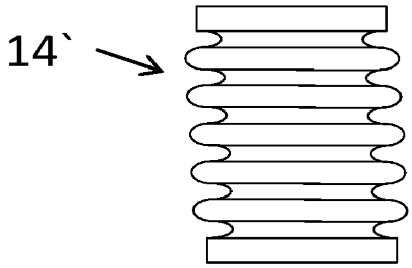
FIG. 5B is a similar view of the flexible bellow seal of FIG. 5A, in the rest position.

FIGS. 5A and 5B show another example of a flexible bellow gasket 14' having four folds.

Figure 6:
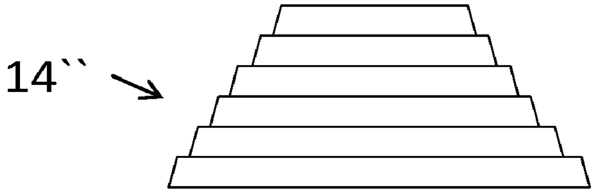
FIG. 6 is a perspective view of a second variant of the flexible bellow seal, shown in rest position.

FIG. 6 shows another example of flexible bellow gasket 14" having a pyramidal shape, the smallest end of the pyramid being the end fixed to the handle structure 3.

The invention claimed is:

1. A vehicle door handle assembly comprising:

a handle trigger comprising:

an articulated end so that the handle trigger can be movable around the articulated end between a rest position and an open position when a user pulls on the handle trigger, and an activation end at an opposite side of the articulated end, to release a latch of the vehicle door, the activation end including a rod with a fastening mean configured to be fastened to a flexible cable, the fastening mean being disposed on a free end of the rod;

a handle structure intended to be fixed to the panel of the vehicle door, the handle trigger being connected to the handle structure, a first end of the handle structure including a through-housing intended to pass through a hole of the panel of the vehicle door, allowing the flexible cable to be fastened to the fastening mean of the activation end, and a second end of the handle structure including a cavity which houses a rotation spindle mounted in a cylindrical cavity of the articulated end of the handle trigger; and a flexible bellow gasket housed into the handle structure and arranged between the activation end of the handle trigger and the handle structure, wherein a first end of the flexible bellow gasket is fixed to the activation end around the rod and a second end of the flexible bellow gasket is arranged at an opening of the through-housing inside the handle structure, and wherein the flexible bellow gasket is squeezed in the rest position and is expanded in the open position.

2. The vehicle door handle assembly according to claim 1, wherein the flexible bellow gasket has a cylindrical shape.

3. The vehicle door handle assembly according to claim 1, wherein each end of the flexible bellow gasket have has a respective retaining collar.

4. The vehicle door handle assembly according to claim 1, wherein the flexible bellow gasket has a pyramidal shape, a smallest end being on a handle structure side.

5. The vehicle door handle assembly according to claim 1, wherein the flexible bellow gasket is made of silicone, caoutchouc or of an elastomer.

6. The vehicle door handle assembly according to claim 1, wherein the vehicle door handle assembly comprises an elastic member interposed between the handle trigger and the handle structure to force the handle trigger back to the rest position.

7. The vehicle door handle assembly according to claim 1, wherein the vehicle door handle assembly comprises an electrical commutator, which is activated in the open position by the activation end of the handle trigger.

* * * * *